US010233951B2

(12) United States Patent
Lomax et al.

(10) Patent No.: US 10,233,951 B2
(45) Date of Patent: Mar. 19, 2019

(54) METHOD TO DETECT UNCOMMANDED SPOOL VALVE POSITIONING AND STOP FLUID FLOW TO HYDRAULIC ACTUATORS

(71) Applicant: Caterpillar Inc., Peoria, IL (US)

(72) Inventors: David J. Lomax, Clayton, NC (US); Joshua D. Callaway, Cary, NC (US)

(73) Assignee: Caterpillar Inc., Deerfield, IL (US)

( * ) Notice: Subject to any disclaimer, the term of this patent is extended or adjusted under 35 U.S.C. 154(b) by 206 days.

(21) Appl. No.: 15/286,135

(22) Filed: Oct. 5, 2016

(65) Prior Publication Data

US 2018/0094650 A1 Apr. 5, 2018

(51) Int. Cl.
*F15B 13/08* (2006.01)
*F16K 37/00* (2006.01)
*F16K 31/36* (2006.01)
*G05D 7/06* (2006.01)
*G05D 7/00* (2006.01)

(52) U.S. Cl.
CPC .......... *F15B 13/0871* (2013.01); *F16K 31/36* (2013.01); *F16K 37/0083* (2013.01); *G05D 7/005* (2013.01); *G05D 7/0635* (2013.01)

(58) Field of Classification Search
CPC ...... E02F 9/2221; E02F 9/2226; F15B 20/008
See application file for complete search history.

(56) References Cited

U.S. PATENT DOCUMENTS

| 4,520,902 | A | 6/1985 | Snow |
| 4,542,767 | A | 9/1985 | Thornton et al. |
| 5,295,795 | A * | 3/1994 | Yasuda .................. E02F 9/2235 417/213 |
| 5,992,591 | A | 11/1999 | Legorburu Gabilondo |
| 6,055,851 | A * | 5/2000 | Tanaka ................... E02F 9/2235 73/40 |
| 6,176,126 | B1 | 1/2001 | Tsuruga et al. |
| 8,037,807 | B2 | 10/2011 | Callaghan et al. |
| 8,756,916 | B2 * | 6/2014 | Sato ....................... E02F 9/2246 60/284 |
| 8,880,302 | B1 * | 11/2014 | Tachibana ............... F15B 21/02 60/459 |
| 2008/0264499 | A1* | 10/2008 | Bacon ..................... E02F 9/226 137/563 |

(Continued)

FOREIGN PATENT DOCUMENTS

GB 2394318 A * 4/2004 ............ E02F 9/2235

*Primary Examiner* — Michael Leslie
*Assistant Examiner* — Matthew Wiblin
(74) *Attorney, Agent, or Firm* — Miller, Matthias & Hull

(57) ABSTRACT

A system and method for detecting uncommanded positioning of at least one valve spool in a plurality of valve spools and for stopping fluid flow to a plurality of hydraulic actuators fluidly connected to the plurality of valve spools is disclosed. The method may comprise receiving a signal fluid pressure detected in a signal passageway, identifying whether at least one activation command is currently enabled, and stopping the flow of fluid to the plurality of hydraulic actuators if no activation command is enabled for any of the plurality of valve spools, and the signal fluid pressure when detected (1) upstream of the plurality of valve spools is greater than a first threshold or (2) downstream of the plurality of valve spools is less than a second threshold.

20 Claims, 4 Drawing Sheets

(56) References Cited

U.S. PATENT DOCUMENTS

| | | | |
|---|---|---|---|
| 2010/0011757 A1* | 1/2010 | Satake | E02F 3/965 60/459 |
| 2013/0325235 A1* | 12/2013 | Kurikuma | E02F 9/207 701/22 |
| 2015/0083260 A1 | 3/2015 | Morikawa et al. | |

* cited by examiner

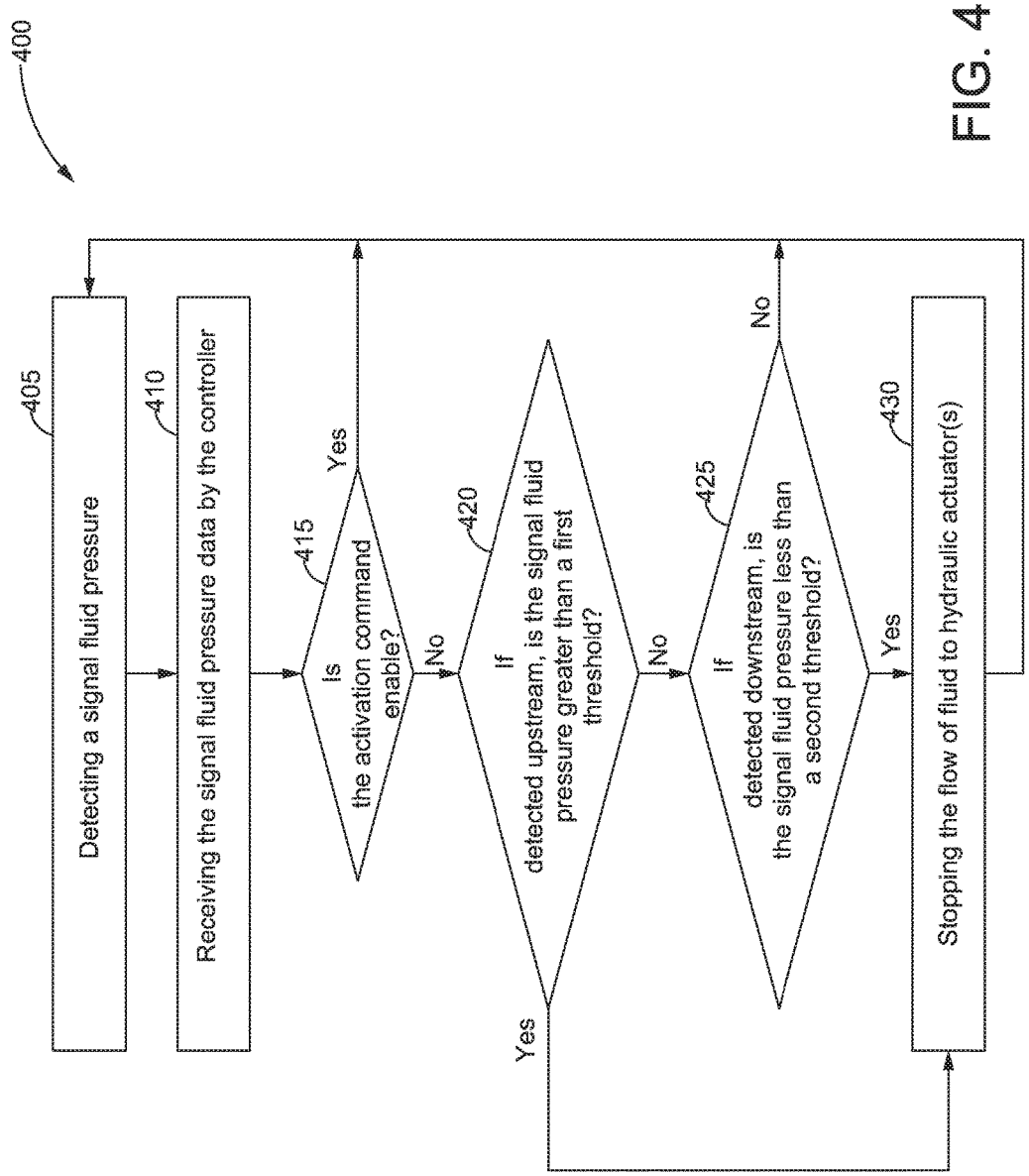

METHOD TO DETECT UNCOMMANDED SPOOL VALVE POSITIONING AND STOP FLUID FLOW TO HYDRAULIC ACTUATORS

TECHNICAL FIELD

The present disclosure generally relates to control processes in machines and, more particularly, relates to processes for use in detecting uncommanded valve spool positioning on a machine and stopping the flow of fluid to the hydraulic actuators on the machine.

BACKGROUND

Excavators, and similar earth-moving equipment typically utilize hydraulic actuators, which may include cylinders and hydraulic motors, to operate functions of the machine, such as movement of an implement. In some control systems, electronic controls send current to a solenoid to activate a valve spool. Typically, if there are no commands from the operator, the solenoids are not activated and the valve spools are in a neutral position. In such neutral position the valve spools block flow to the hydraulic actuators. In the event of a malfunction in the system, it is possible that one or more valve spools may be shifted when there is no active command from the operator. This may result in unintended operation of the function of the machine controlled by the valve spool, for example unintended movement of an implement.

U.S. Pat. No. 6,176,126 ("Tsuruga et al.") issued Jan. 23, 2001 describes an engine speed control system for a construction machine arranged in association with a hydraulic circuit. The engine speed control system is provided with pilot valves arranged in a pilot line to control traveling, booms and the like. Automatic idling control or its cancellation is provided in accordance with signals from pressure sensors. While beneficial, a system may be needed for detecting uncommanded positioning of a valve spool that controls a function of the machine and subsequently taking action to stop the flow of fluid to the hydraulic actuators upon such detection.

SUMMARY OF THE DISCLOSURE

In accordance with another aspect of the disclosure, a method for detecting uncommanded positioning of at least one valve spool in a plurality of valve spools and for stopping flow of a fluid to a plurality of hydraulic actuators fluidly connected to the plurality of valve spools is disclosed. The plurality of valve spools are disposed downstream of a hydraulic pump and upstream of a reservoir. Each valve spool has a neutral position and at least one active position. Each valve spool is configured to block flow of the fluid to at least one of the plurality of hydraulic actuators when the valve spool is in the neutral position and is further configured to provide flow of the fluid to at least one of the hydraulic actuators when the valve spool is not in the neutral position. The plurality of valve spools are fluidly connected to a plurality of pilot pressure reducing valves. Each valve spool is configured to maintain the active position when a pilot solenoid of one of the pilot pressure reducing valves is activated. The pilot solenoid is activated when an activation command associated with a function of the machine controlled by the valve spool is enabled. The activation command is received by a controller from a user interface. The method comprises receiving, by the controller, a signal fluid pressure detected in a signal passageway; identifying, by the controller, whether at least one activation command is currently enabled; and stopping, by the controller, the flow of fluid to the plurality of hydraulic actuators if no activation command is enabled for any of the plurality of valve spools, and the signal fluid pressure when detected (1) upstream of the plurality of valve spools is greater than a first threshold or (2) downstream of the plurality of valve spools is less than a second threshold. In an embodiment, when each valve spool of the plurality of valve spools is in the neutral position, the signal passage extends through each valve spool of the plurality of valve spools, and when any valve spool of the plurality of valve spools is not in the neutral position or is in the active position, the signal passageway is blocked by the valve spool that is not in the neutral position or is in the active position.

In accordance with one aspect of the disclosure, a system for detecting uncommanded positioning of a first valve spool of a plurality of valve spools and for stopping flow of a fluid to a plurality of hydraulic actuators fluidly connected to the plurality of valve spools is disclosed. The system may comprise the plurality of hydraulic actuators disposed on a machine, the plurality of valve spools disposed downstream of a hydraulic pump and upstream of a reservoir, a plurality of pilot pressure reducing valves, a signal passageway, a hydraulic pump, user interface and a controller. The first valve spool of the plurality of valve spools has a neutral position and at least one active position. The first valve spool is configured to block flow of the fluid to the hydraulic actuator when in the neutral position and is further configured to provide flow of the fluid to the hydraulic actuator when not in the neutral position or when in the active position. Each pilot pressure reducing valve is fluidly connected to one of the plurality of valve spools. Each pilot pressure reducing valve may include a pilot solenoid configured to activate the pilot pressure reducing valve. Each pilot pressure reducing valve is configured to place one of the valve spools in the neutral position or in the active position. The signal passageway extends, when each valve spool of the plurality of valve spools is in the neutral position, through each valve spool of the plurality of valve spools to a reservoir. When any valve spool of the plurality of valve spools is in the active position, the signal passageway is blocked by the valve spool in the active position. The hydraulic pump is configured to supply hydraulic fluid to the signal passageway and to the hydraulic actuators via the plurality of valve spools. The user interface is configured to receive an activation command from a user. The activation command is associated with a machine function controlled by one or more of the plurality of valve spools. The controller is configured to: receive a signal fluid pressure detected in a signal passageway; identify whether at least one activation command is currently enabled; and stop the flow of fluid to the plurality of hydraulic actuators if no activation command is enabled for any of the plurality of valve spools, and the signal fluid pressure when detected (1) upstream of the plurality of valves spools is greater than a first threshold or (2) downstream of the plurality of valve spools is less than a second threshold.

In accordance with another aspect of the disclosure, a method for detecting uncommanded positioning of a first valve spool of a plurality of valve spools and for stopping flow of a fluid to a first hydraulic actuator that is fluidly connected to the first valve spool is disclosed. The plurality of valve spools are disposed downstream of a hydraulic pump and upstream of a reservoir. The first valve spool has a first position and a second position. The first valve spool is configured to block flow of the fluid to the first hydraulic actuator when the first valve spool is in the first position and is further configured to provide flow of the fluid to the first hydraulic actuator when the first valve spool is not in the first position or is in the second position. The first valve spool is configured to maintain the second position when a pilot supply is activated. The pilot supply is activated when an activation command for a function of the machine controlled by the first valve spool is enabled. The activation command is received by a controller from a user interface. The method comprises: receiving, by the controller, a signal fluid pressure detected in a signal passageway; identifying, by the controller, whether the activation command is currently enabled; and stopping, by the controller, the flow of fluid to the first hydraulic actuator if no activation command is enabled for the first valve spool and the signal fluid pressure (1) when detected upstream of the plurality of signal valves is greater than a first threshold or (2) when detected downstream of the plurality of signal valves is less than a second threshold. When the first valve spool is in the first position, the signal passage extends through the first valve spool, and when the first valve spool is in the second position or is not in the first position, the signal passageway is blocked by the first valve spool.

BRIEF DESCRIPTION OF THE DRAWINGS

FIG. 4 is an exemplary method for detecting and stopping uncommanded positioning of the valve spool 122.

DETAILED DESCRIPTION

Figure 1:
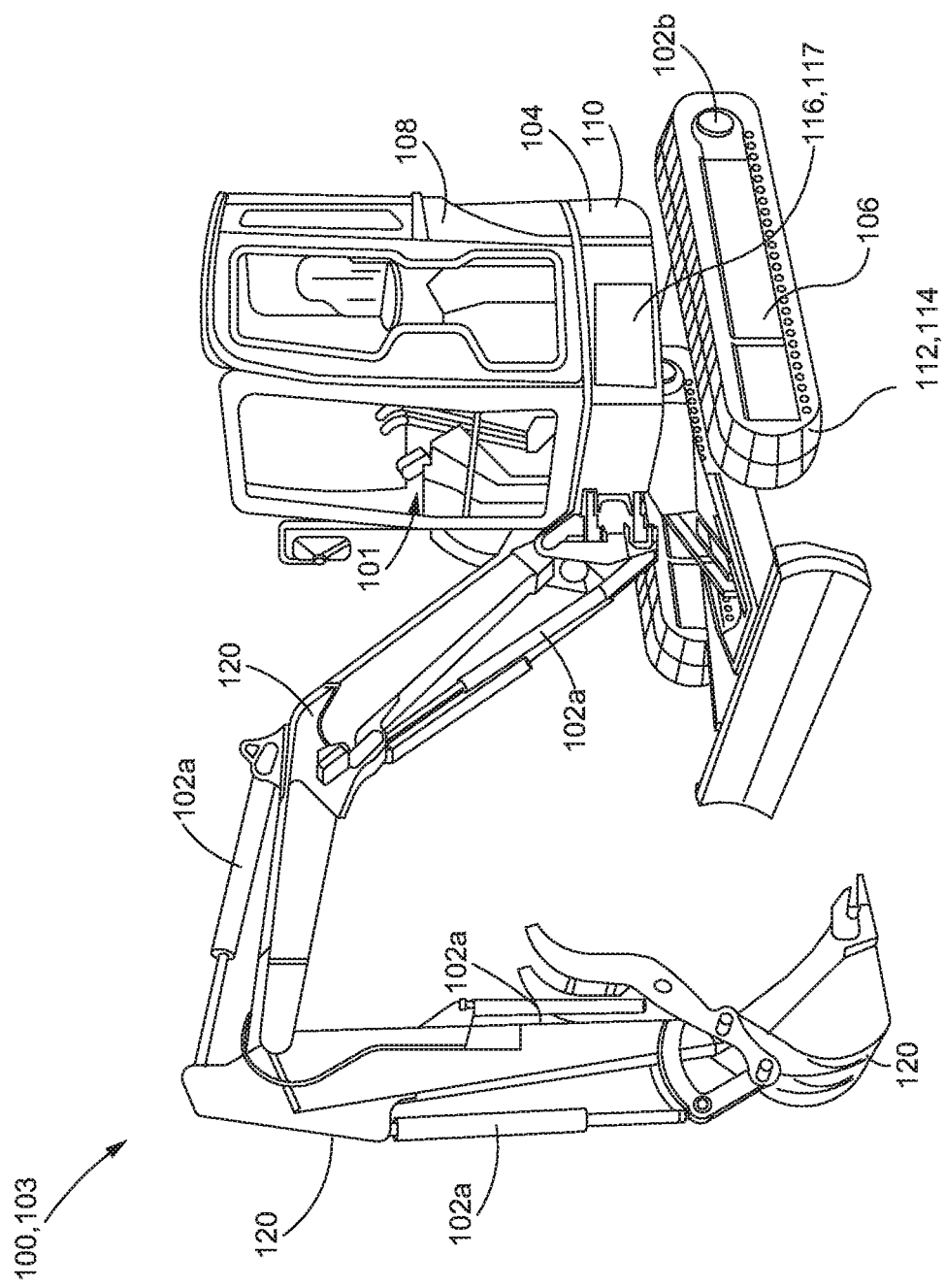
FIG. 1 is a side view of an exemplary machine 100 that includes the exemplary system 101 of FIG. 2 or 3.

FIG. 1 illustrates one example of a machine 100 that incorporates the system 101 of the present disclosure. The exemplary machine 100 may be a vehicle such as an excavator or other vehicle that uses hydraulic actuators 102 (e.g., hydraulic cylinders 102a or hydraulic motors 102b) to control functions of the machine 100. FIG. 1 illustrates an exemplary machine 100 that is a hydraulic excavator 103. The exemplary machine 100 includes an upper carriage 104 disposed on a lower carriage 106. The upper carriage 104 includes an operator station 108 and a body 110. The lower carriage 106 includes one or more ground engaging units 112. In the exemplary embodiment, the ground engaging units 112 are track assemblies 114. One of ordinary skill in the art will appreciate that the machine 100 further includes a power source 116, for example an engine 117, that provides power to the ground engaging units 112 and a final drive assembly (not shown) via a mechanical or electrical drive train. While the following detailed description and drawings are made with reference to a hydraulic excavator 103, the teachings of this disclosure may be employed on similar machines 100 that use hydraulic actuators 102 to control functions of the machine 100.

The machine 100 further includes a system 101 (FIGS. 2-3) for detecting uncommanded positioning of a valve spool 122 in a plurality of valve spools 122 and for stopping fluid flow to hydraulic actuators 102 that are fluidly connected to the plurality of valve spools 122 and control one or more functions of the machine 100. By extension, such a function may be, for example, movement of an implement 120 (FIG. 1), or portion of an implement 120 (such as a boom, a stick or a bucket), the operation of a motor, or the like. Uncommanded positioning refers to a valve spool 122 in a position that is not compatible with or associated with a currently enabled activation command.

Figure 2:
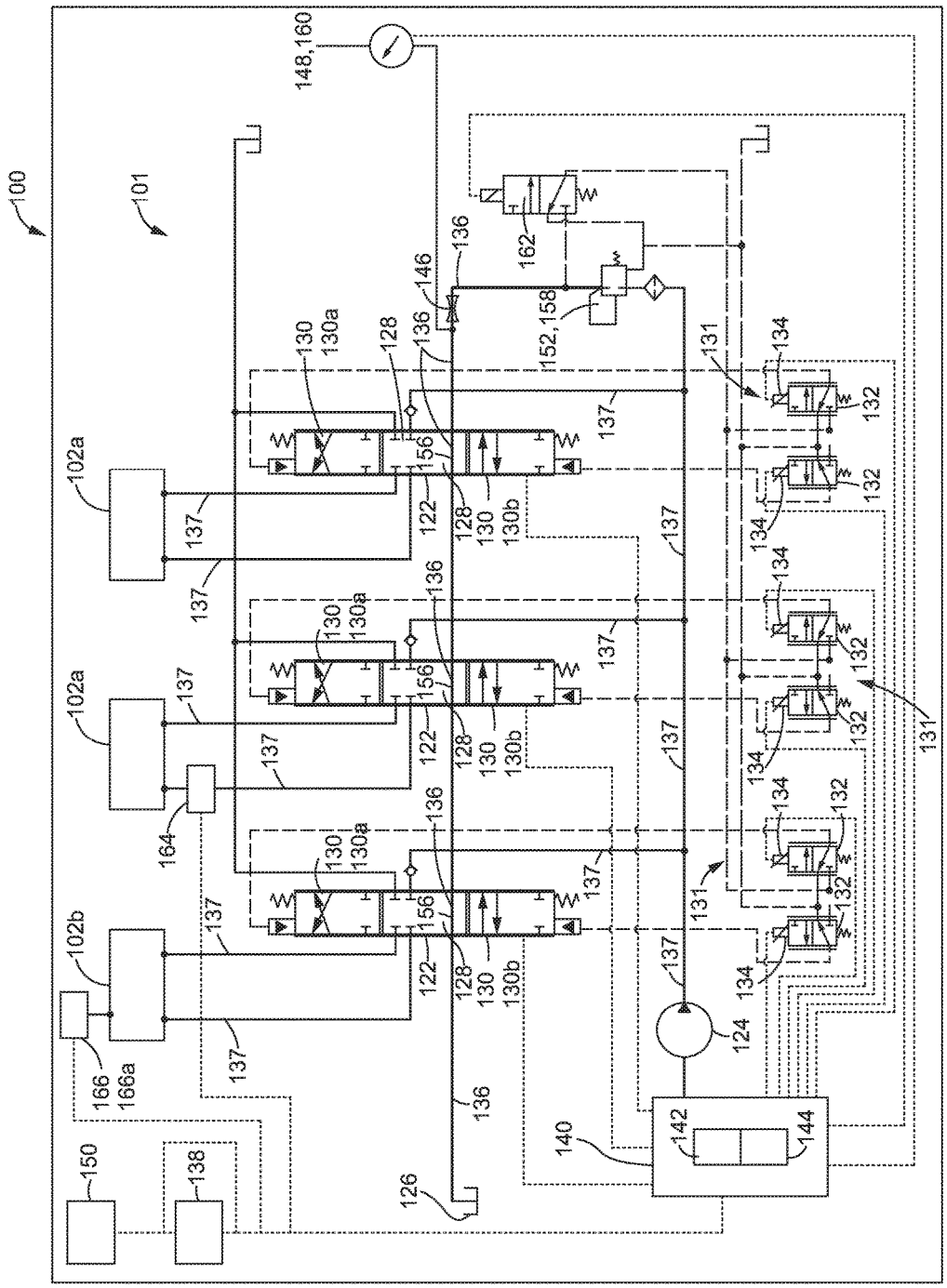
FIG. 2 is a schematic representation of the exemplary system 101 including a valve spool 122.

FIG. 2 illustrates one embodiment of the system 101. As shown in FIG. 2, the system 101 comprises one or more valve spools 122, a reservoir 126, one or more pilot oil pressure supplies 131, a signal passageway 136, a controller 140 and a pressure detector 148. The system 101 may further comprise a hydraulic pump 124, one or more hydraulic actuators 102 on the machine 100, a user interface 138 and a low-pressure source 152. In some embodiments, the system 101 may further include a pilot shutoff solenoid 162. In some embodiments, the system 101 may include a display 150. In some embodiments, the system 101 may include a lock valve 164. In some embodiments, the system 101 may include a brake 166.

The hydraulic actuators 102 control the operations of various functions of the machine 100. For example, one or more hydraulic actuators 102 may control the operation of an implement 120 or a portion of the implement 120. The hydraulic actuators 102 may be hydraulic cylinders 102a, hydraulic motors 102b or the like. In the exemplary embodiment of FIG. 2, there are a plurality of hydraulic cylinders 102a as well as a hydraulic motor 102b.

Each valve spool 122 is fluidly connected to one or more of the hydraulic actuators 102 and may be selectively switched from a closed state to an open state, and vice versa. In the exemplary embodiment shown in FIG. 2, each valve spool 122 has a neutral position 128 and one or more active positions 130 where fluid flow is delivered to one or more hydraulic actuators 102. In the exemplary embodiment of FIGS. 2-3, each valve spool 122 has a first active position 130a and a second active position 130b. The valve spool 122 is configured to block fluid flow to the hydraulic actuator 102 operatively connected to the valve spool 122 when in the closed state (in the embodiment of FIG. 2, the neutral position 128) and is further configured to provide fluid flow to the hydraulic actuator 102 when in the open state (in the embodiment of FIG. 2, the first active position 130a or the second active position 130b). In the exemplary embodiment shown in FIG. 2, there is a plurality of valve spools 122 disposed downstream of the hydraulic pump 124 and upstream of the reservoir 126. Each valve spool 122 includes a bore 156 therethrough that is part of the signal passageway 136 when the valve spool 122 is in the closed state (neutral position 128). Each valve spool 122 is fluidly connected to one or more pilot oil pressure supply(ies) 131. Each valve spool 122 is configured to maintain the active position 130 when the pilot oil pressure supply 131 connected to the valve spool 122 is activated.

Each pilot oil pressure supply 131 may include a pilot pressure reducing valve 132 (or, alternatively, another appropriate pilot valve for actuating a valve spool 122). In the exemplary embodiment, the pilot oil pressure supply 131 includes a pilot pressure reducing valve 132. The pilot pressure reducing valve 132 includes a pilot solenoid 134 (e.g., an electronic pilot pressure reducing solenoid) configured to activate the pilot pressure reducing valve 132. The pilot oil pressure supply 131 is activated when an activation command associated with a function of the machine 100 controlled by one of the valve spools 122 is enabled. In the exemplary embodiment of FIG. 2, a pair of pilot pressure reducing valves 132 is fluidly connected to each valve spool 122. The pair of pilot pressure reducing valve(s) 132 is configured to place the valve spool 122 in the neutral position 128 or one or more active positions 130 (e.g. the first active position 130a, the second active position 130b). When a pilot pressure reducing valve 132 is activated by its respective pilot solenoid 134, the pilot pressure reducing valve 132 activates the valve spool 122 to the open state. More specifically, in the exemplary embodiment of FIG. 2, one of the pair of pilot pressure reducing valves 132 is configured to activate the valve spool 122 to the first active position 130a and the other of the pair of pilot pressure reducing valves 132 is configured to activate the valve spool 122 to the second active position 130b. When the pair of pilot pressure reducing valves 132 is not activated, the associated valve spool 122 is in the neutral position 128.

When each valve spool 122 (of the plurality of valve spools 122) is in the neutral position 128, the signal passageway 136 extends, from the low pressure source 152 through the bore 156 of each of the plurality of valve spools 122 to the reservoir 126. When any valve spool 122 (of the plurality of valve spools 122) is not in the neutral position 128 or is in the one of the active positions 130, the signal passageway 136 is blocked by such valve spool 122 that is out of the neutral position 128 or is in the active position 130.

The signal passageway 136 may be configured such that the measured pressure of the signal fluid in the signal passageway 136 (the signal fluid pressure) when a valve spool 122 is in an active position 130 is either (1) greater than a first threshold when the detection point (point of measurement) is upstream of the valve spool 122, or (2) lower than a second threshold when the detection point is downstream of the valve spool 122. The signal passageway 136 may include an orifice 146. In the embodiment of FIG. 2, the orifice 146 is disposed downstream of the low pressure source 152 and upstream of the plurality of valve spools 122. The cross-sectional area of the orifice 146 is smaller than the comparable cross-sectional area of the signal passageway 136 (including the portion through the valve spools 122 (the bores 156)). The smaller cross-sectional area of the orifice 146 limits the amount of signal fluid traveling in the signal passageway 136 through the valve spools 122 to the reservoir 126. In the embodiment of FIG. 2, the orifice 146 is dimensioned to allow for the signal fluid pressure downstream of the orifice 146 and upstream of the plurality of valve spools 122 to be low when the signal passageway 136 is open (not blocked by any valve spools 122) but large enough to allow sufficient flow into the downstream signal passageway 136 such that the signal fluid pressure builds up quickly when the signal passageway 136 is blocked by a valve spool 122.

The hydraulic pump 124 is configured to supply hydraulic fluid to the hydraulic actuators 102 via the plurality of valve spools 122. Conduits 137 carry fluid from the hydraulic pump 124 to the valve spools 122 and from the valve spools 122 to the hydraulic actuators 102.

In the embodiment of FIG. 2 (and FIG. 3), the hydraulic pump 124 is also configured to supply signal fluid to the signal passageway 136. More specifically, the hydraulic pump 124 supplies fluid, at a first pressure, to the low pressure source 152 of FIG. 2 that is a pressure reduction valve 158. The pressure reduction valve 158 is configured to reduce the pressure of incoming fluid supplied by the hydraulic pump 124 to a second, lower, pressure. This lower pressure fluid is then supplied/discharged by the pressure reduction valve 158 to the signal passageway 136 as signal fluid. In the embodiment of FIG. 2 (and FIG. 3), the hydraulic pump 124 is also configured to supply fluid to the pilot oil pressure supply 131 (e.g., pilot pressure reducing valves 132) via the pressure reduction valve 158.

Figure 3:
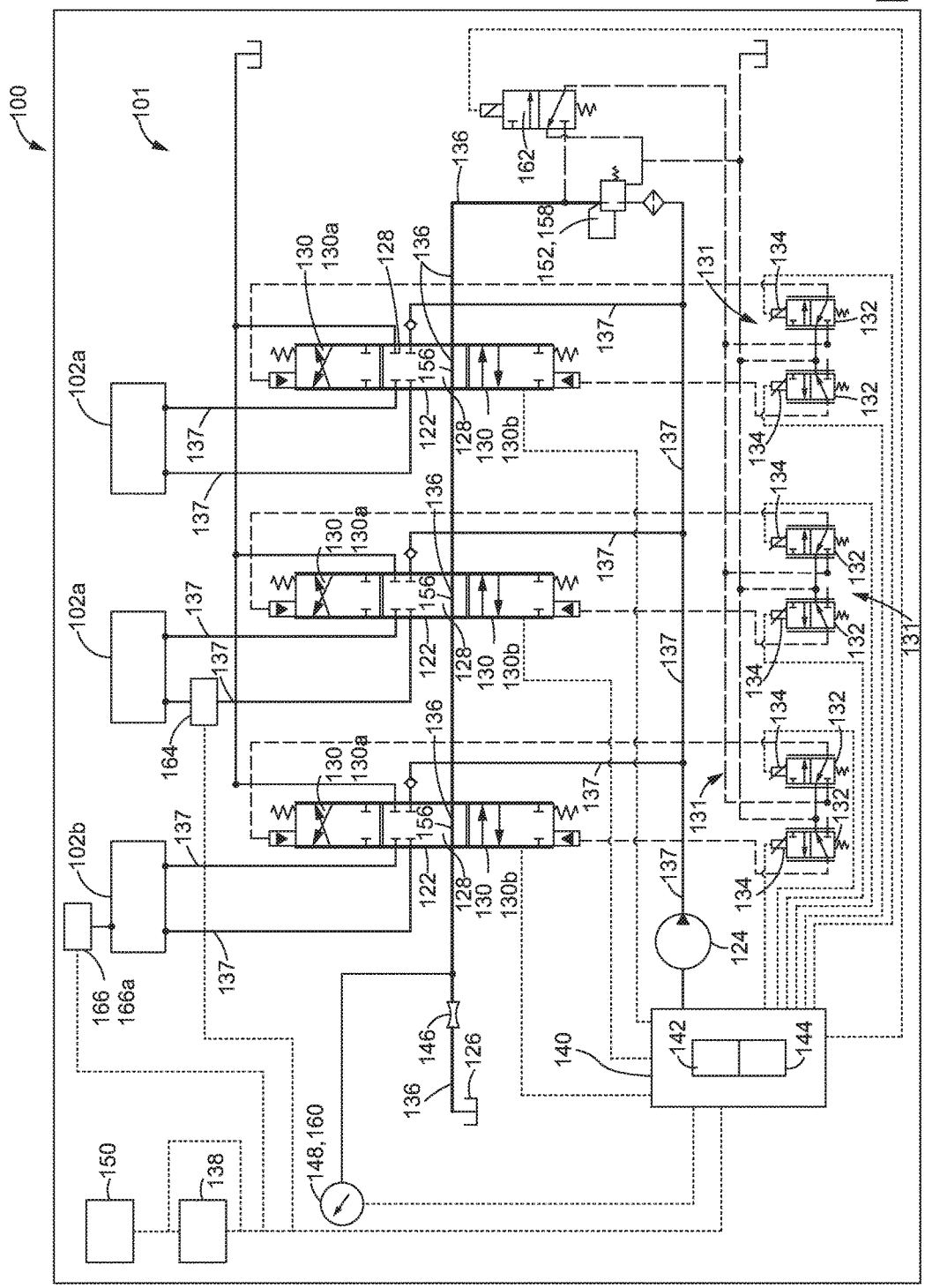
FIG. 3 is a schematic representation of an alternative exemplary system 101.

Alternatively, the low pressure source 152 may be a separate pilot pump instead of the pressure reduction valve 158 illustrated in FIG. 2 (and FIG. 3). In that arrangement, the hydraulic pump 124 would not need to supply fluid to the low pressure source 152; instead the pilot pump (low pressure source 152) obtains fluid from a tank, or the like, and provides such fluid (at the appropriate pressure) to the signal passageway 136 and the pilot pressure reducing valves 132. While this embodiment acquires low pressure through the low pressure source 152, other embodiments could provide higher fluid pressure from other sources such as directly from the hydraulic pump 124.

The pressure detector 148 is configured to detect a pressure measurement of the signal fluid in the signal passageway 136, the signal fluid pressure, and is further configured to transmit data to the controller 140 that is indicative of either the value of the signal fluid pressure or the relative value of the signal fluid pressure as compared to a threshold. The pressure detector 148 may be disposed downstream of the orifice 146 and upstream of the plurality of valve spools 122 as shown in FIG. 2, or, alternatively, may be disposed downstream of the plurality of valve spools 122 and upstream of the orifice 146 as shown in FIG. 3. The pressure detector 148 may be a pressure sensor 160 or a pressure switch. In the exemplary embodiment illustrated in FIG. 2, the pressure detector 148 is a pressure sensor 160 disposed downstream of the orifice 146 and upstream of the plurality of valve spools 122.

The user interface 138 is in operable communication with the controller 140 and is configured to receive from a user and to transmit to the controller 140 an activation command. In an embodiment, the user interface 138 may be a joystick, lever, dial or the like. The activation command is associated with a requested function of the machine 100.

The lock valve 164 may be operatively connected to the hydraulic actuator 102 and is configured to stop the flow of fluid through the conduit 137 to the hydraulic actuator 102.

The brake 166 is operatively connected to a hydraulic actuator 102, such as a hydraulic motor 102b, and is configured to stop the operation of such hydraulic motor 102b. In the embodiment of FIGS. 2-3, the brake is a swing break 166a.

The pilot shutoff solenoid 162 is fluidly connected to each of the pilot oil pressure supplies 131 (e.g., pilot pressure reducing valves 132). During operation of the machine 100, the pilot shutoff solenoid 162 is activated to allow pilot oil to flow to each of the pilot oil pressure supplies 131 (e.g., each pilot pressure reducing valve 132). When deactivated, the pilot shutoff solenoid 162 stops the flow of pilot oil to each of the pilot oil pressure supplies 131 (e.g., stops the flow of pilot oil to each pilot pressure reducing valve 132).

The controller 140 is in operable communication with pilot oil pressure supply 131 (e.g., the pilot solenoids 134), the low-pressure source 152, the hydraulic pump 124, the pressure detector 148 and the user interface 138. The controller 140 may also be in communication with the plurality of valve spools 122 and the display 150. The controller 140 may also be in communication with pilot shutoff solenoid 162. The controller 140 may also be in communication with the lock valve 164. The controller 140 may also be in communication with the swing brake 166a.

The controller 140 may include a processor 142 and a memory component 144. The processor 142 may be a microprocessor or other processor as known in the art. The processor 142 may execute instructions and generate control signals for processing data related to signal fluid pressure, activating pilot oil pressure supplies 131 (e.g., activating pilot solenoids 134), determining of whether activation commands are enabled, stopping the flow of fluid to the hydraulic actuators 102 and other related operations. Such instructions that are capable of being executed by a computer may be read into or embodied on a computer readable medium, such as the memory component 144 or provided external to the processor 142. In alternative embodiments, hard wired circuitry may be used in place of, or in combination with, software instructions to implement a control method.

The term "computer readable medium" as used herein refers to any non-transitory medium or combination of media that participates in providing instructions to the processor 142 for execution. Such a medium may comprise all computer readable media except for a transitory, propagating signal. Forms of computer-readable media include, for example, any magnetic medium, a CD-ROM, any optical medium, or any other medium from which a computer processor 142 can read.

The controller 140 is not limited to one processor 142 and memory component 144. The controller 140 may be several processors 142 and memory components 144.

The controller 140 is configured to identify or determine whether an activation command for a function of the machine 100 that is controlled by the plurality of valve spools 122 has been enabled (by, for example, the user interface 138). The controller 140 is configured to receive data that is indicative of either the value of the signal fluid pressure (in the signal passageway 136) or the relative value of the signal fluid pressure as compared to a threshold.

The controller 140, in some embodiments, may determine whether the signal fluid pressure in the signal passageway 136 is greater than a first threshold. Alternatively or in addition to, the controller 140 may, in some embodiments, determine whether the signal fluid pressure in the signal passageway 136 is less than a second threshold.

The controller 140 is further configured to stop the flow of fluid to the plurality of hydraulic actuators 102 if no activation command (associated with any of the plurality of valve spools 122) is enabled, and the signal fluid pressure when detected (1) upstream of the plurality of valves spools 122 is greater than a first threshold or (2) downstream of the plurality of valve spools 122 is less than a second threshold. The flow of fluid to the plurality of hydraulic actuators 102 may be stopped by one or more of the following: stopping (shutting-off) the hydraulic pump 124, deactivating the pilot solenoid 134 of each pilot pressure reducing valve 132, or deactivating the pilot shutoff solenoid 162 that is operatively connected to each of the plurality of pilot pressure reducing valves 132. In some embodiments, the controller 140 may be configured to activate a brake 166 (e.g., a swing brake 166a) operatively connected to a hydraulic actuator 102 such as a hydraulic motor 102b. In some embodiments, the controller 140 may be configured to activate a lock valve 164 operatively connected to a hydraulic actuator 102 to stop the flow of fluid to the hydraulic actuator 102. In some embodiments, the controller 140 may be further configured to display a warning on the display 150 when no activation command (associated with any of the plurality of valve spools 122) is enabled and the signal fluid pressure when detected (1) upstream of the plurality of valves spools 122 is greater than a first threshold or (2) downstream of the plurality of valve spools 122 is less than a second threshold.

FIG. 3 illustrates another embodiment of the system 101. The system 101 of FIG. 3 is the same as that of FIG. 2 except that the pressure detector 148 and the orifice 146 are disposed downstream of the plurality of valve spools 122.

The orifice 146 is disposed in the signal passageway 136 downstream of the pressure detector 148. Similar to the orifice 146 of FIG. 2, it has a cross-sectional area that is smaller than the comparable cross-sectional area of the signal passageway 136 (including the portion through the valve spools 122 (the bores 156)). The smaller cross-sectional area of such orifice 146 limits the amount of signal fluid traveling in the signal passageway 136 downstream of the orifice 146. In the embodiment of FIG. 3, the orifice 146 is dimensioned to allow for the signal fluid pressure taken upstream of the orifice 146 and downstream of the plurality of valve spools 122 to be relatively high when the signal passageway 136 is open (not blocked by any valve spools 122) but large enough to allow sufficient draining of the signal fluid into the signal passageway 136 downstream of the orifice 146. This accentuates the difference between the higher signal fluid pressure detected when the signal passageway 136 is open vs. the lower signal fluid pressure fluid detected when the signal passageway 136 is partially blocked or the substantially zero signal fluid pressure detected when the signal passageway 136 is blocked.

INDUSTRIAL APPLICABILITY

In operation the hydraulic pump 124 supplies pressurized fluid to the valve spools 122 via the conduit 137. In the embodiments of FIGS. 2-3, the hydraulic pump 124 also supplies pressurized fluid to the low pressure source 152 (the pressure reduction valve 158) via the conduit 137. The portion of the fluid that flows to the pressure reduction valve 158 is received by such at a first pressure. The pressure reduction valve 158 discharges the fluid to both the signal passageway 136 and to the pilot oil pressure supplies 131 (e.g., the pilot pressure reducing valves 132) at a second pressure that is significantly less than the first pressure.

Fluid flows through the signal passageway 136. In the embodiment of FIG. 2, the fluid flows through an orifice 146 disposed inside the signal passageway 136 before the plurality of valve spools 122. In the embodiment of FIG. 2, the pressure detector 148 is a pressure sensor 160 that is disposed downstream of the orifice 146 and upstream of any of the plurality of valve spools 122. The pressure sensor 160 detects the signal fluid pressure in the signal passageway 136 downstream of the orifice 146 and upstream of the plurality of valve spools 122. The pressure sensor 160 transmits the detected signal fluid pressure to the controller 140. Alternatively, if the pressure detector 148 is a pressure switch instead of a pressure sensor 160, the pressure detector 148 may transmit data indicative of the value of the measured signal fluid pressure as compared to a threshold.

When no activation command is enabled (for a function of the machine 100 that is controlled by the plurality of valve spools 122) none of the pilot solenoids 134 should be activated and, thus, none of the pilot pressure reducing valves 132 should be activated. Moreover, if none of the pilot pressure reducing valves 132 are activated (all are deactivated), then all of the plurality of valve spools 122 should be in the neutral position 128 and the signal passageway 136 extends through the bore 156 of each of the valve spool 122; thus, the signal fluid travels unobstructed through each of the plurality of valve spools 122 to the reservoir 126.

When the signal passageway 136 is open and unobstructed (all of the plurality of valve spools 122 are in the neutral position 128), the signal fluid pressure, when detected upstream of the plurality of valve spools 122, may be referred to as the upstream neutral pressure. When one or more of the valve spools 122 is activated (e.g., in the active position 130), the activated valve spool(s) 122 will block the signal passageway 136 and the signal fluid will not be able to flow through the activated valve spool 122 to the reservoir 126. As such, the signal fluid pressure will build/increase upstream of the activated valve spool 122. Thus, the signal fluid pressure that is detected upstream of the plurality of valve spools 122 by the pressure sensor 160 will be higher than that of the upstream neutral pressure.

The system 101 of FIG. 3 operates similarly to the system 101 of FIG. 2. If none of the pilot pressure reducing valves 132 are activated (all are deactivated), then all of the valve spools 122 should be in the neutral position 128 and the signal passageway 136 extends through each of the valve spools 122. The signal passageway 136 is open/unobstructed and the signal fluid flows through each of the plurality of valve spools 122 to the reservoir 126. However, because the pressure sensor 160 and orifice 146 of FIG. 3 are disposed downstream (instead of upstream) of the plurality of valve spools 122, the signal fluid pressure detected by the pressure sensor 160 of FIG. 3 is lower than that which would have been detected in the system 101 of FIG. 2 where the pressure sensor 160 is disposed upstream of the plurality of valve spools 122. When the signal passageway 136 is open and unobstructed, the signal fluid pressure detected downstream of the plurality of valve spools 122 in FIG. 3 may be referred to as the downstream neutral pressure. The downstream neutral pressure is less than the upstream neutral pressure of FIG. 2 because of the pressure drop typically experienced across the plurality of valves spools 122 during operation of the system 101.

When one or more of the valve spools 122 are activated (e.g., in the active position 130) the activated valve spool(s) 122 will block the signal passageway 136 and signal fluid will not be able to flow through the activated valve spool(s) 122. As such, the signal fluid pressure will decrease downstream of the activated valve spool 122. Thus the signal fluid pressure detected by the pressure sensor 160 of FIG. 3 will be lower than the downstream neutral pressure detected when the valve spool(s) 122 are deactivated (in the neutral position 128). In some scenarios, the signal fluid pressure detected when one or more value spools is in an active position 130 may be zero.

Occasionally, a valve spool 122 may be out of the neutral position 128 (not in the neutral position 128) and stuck fully or partially in the active position 130 due to debris, damage, malfunction of the valve spool 122, the pilot pressure reducing valve 132, the pilot solenoid 134 or the like. In such a scenario, the signal passageway 136 may be blocked (or partially blocked) even though there is no activation command enabled and all of the valve spools 122 should be in the neutral position 128. The signal fluid pressure will build-up upstream of the plurality of valve spools 122 and little or no signal fluid (and correspondingly, signal fluid pressure) will be downstream of the plurality of valve spools 122.

In the system 101 of FIG. 2, if the signal fluid pressure detected is over a first threshold pressure (e.g., more than the upstream neutral pressure) and there is no activation command currently enabled, such signal fluid pressure is indicative of an uncommanded position of at least one of the valve spools 122 which may result in fluid from the hydraulic pump 124 reaching the hydraulic actuators 102 and causing uncommanded operation of a function of the machine 100 (e.g., uncommanded movement of one or more implements 120). In the system 101 of FIG. 3, if there is no activation command enabled and the signal fluid pressure is less than a second threshold (e.g., less than the downstream neutral pressure), such signal fluid pressure is indicative of an uncommanded position of at least one of the valve spools 122 which may result in fluid from the hydraulic pump 124 reaching the hydraulic actuators 102 and causing uncommanded operation of a function of the machine 100.

FIG. 4 illustrates an exemplary method 400 for detecting uncommanded positioning of a valve spool 122 in a plurality of valve spools 122 and for stopping fluid flow to a plurality of hydraulic actuators 102 fluidly connected to the plurality of valve spools 122.

In block 405, the method 400 includes detecting, by a pressure sensor 160, a signal fluid pressure in the signal passageway 136. The signal fluid pressure (measurement) is transmitted to the controller 140.

In block 410, the method 400 further includes receiving, by the controller 140, data that is indicative of either the value of the signal fluid pressure or the relative value of the signal fluid pressure as compared to a threshold.

In block 415, the method 400 further includes identifying, by the controller 140, whether at least one activation command is currently enabled for at least one function of the machine 100 that is controlled by the plurality of valve spools 122.

In block 420, if the signal fluid pressure is detected upstream of the plurality of valves spools 122, the method 400 further includes determining or identifying by the controller 140 if the signal fluid pressure is greater than a first threshold. In one embodiment, the first threshold may be the upstream neutral pressure. In embodiments in which the signal fluid pressure is only detected downstream of the plurality of valve spools 122, block 420 may be skipped.

In block 425, if the signal fluid pressure is detected downstream of the plurality of valves spools 122, the method 400 further includes determining or identifying by the controller 140 if the signal fluid pressure is less than a second threshold. In one embodiment, the second threshold may be the downstream neutral pressure. In embodiments in which the signal fluid pressure is only detected upstream of the plurality of valve spools 122, block 425 may be skipped.

In block 430, the method 400 includes stopping, by the controller 140, the flow of fluid to the plurality of valve spools 122 if no activation command is enabled for any of the plurality of valve spools 122, and the signal fluid pressure if detected (1) upstream of the plurality of valves spools 122 is greater than the first threshold or if detected (2) downstream of the plurality of valve spools 122 is less than a second threshold.

In one embodiment, the controller 140 may stop the flow of fluid to the plurality of valve spools 122 by deactivating the pilot solenoid 134 of each pilot pressure reducing valve 132 operatively connected to one or more of the plurality of valve spools 122. Alternatively, or in addition to, the controller 140 may stop the flow of fluid to the plurality of valve spools 122 by deactivating the pilot shutoff solenoid 162 to stop the flow of pilot oil to each pilot oil pressure supply 131 (e.g., stopping the flow of pilot oil to each pilot pressure reducing valve 132). Alternatively, or in addition to either or both of the above, the controller 140 may stop the flow of fluid to the plurality of valve spools 122 by stopping or shutting-off the hydraulic pump 124 and thus stopping the flow of fluid through the plurality of valve spools 122 valves to the hydraulic actuators 102. In some embodiments, one or more lock valves 164 may be activated to prevent the flow of fluid to one or more hydraulic actuators 102. In some embodiments, a brake 166 (e.g., a swing brake 166a) may also be activated to stop operation of a hydraulic actuator 102 that is a hydraulic motor 102b. In some embodiments, the controller 140 may also be configured to display a warning notice on a display 150 to alert the operator that uncommanded spool valve positioning has been detected. The warning notice may also alert the operator that corrective action has been implemented (e.g., the hydraulic pump 124 is being shut off, and the pilot solenoids 134 are being deactivated.)

Also disclosed is a method for detecting uncommanded positioning of at least one valve spool 122 in a plurality of valve spools 122 and for stopping fluid flow to a plurality of hydraulic actuators 102 fluidly connected to the plurality of valve spools 122 of the system 101 described herein. The method comprises receiving, by the controller 140, a signal fluid pressure detected in the signal passageway 136; identifying, by the controller 140, whether at least one activation command is currently enabled; and stopping, by the controller 140, the flow of fluid to the plurality of hydraulic actuators 102 if no activation command is enabled for any of the plurality of valve spools 122, and the signal fluid pressure when detected (1) upstream of the plurality of valve spools 122 is greater than a first threshold or (2) downstream of the plurality of valve spools 122 is less than a second threshold.

In an embodiment, the method may further include detecting the signal fluid pressure upstream of a first valve spool 122 in the plurality of valve spools 122, the first valve spool 122 positioned along the signal passageway 136 to receive signal fluid before any of the other valve spools 122 of the plurality of valve spools 122. The method may further include supplying, by the hydraulic pump 124, fluid to the signal passageway 136; reducing the pressure of the fluid provided by the hydraulic pump 124 to the signal passageway 136; and detecting the signal fluid pressure downstream of the orifice 146 in the signal passageway 136 and upstream of the first valve spool 122.

In one embodiment, the flow of fluid to the plurality of hydraulic actuators 102 may be stopped by deactivating the pilot solenoid 134 of each pilot pressure reducing valve 132 or by deactivating a pilot shutoff solenoid 162 that is operatively connected to each of the plurality of pilot pressure reducing valves 132. In an embodiment, the flow of fluid to the hydraulic actuator 102 is stopped by stopping the hydraulic pump 124.

In an embodiment, the method may further include activating, by the controller 140, a brake 166 (e.g., a swing brake 166a) operatively connected to one of the hydraulic actuators 102 if no activation command is enabled for any of the plurality of valve spools 122, and the signal fluid pressure when detected (1) upstream of the plurality of valve spools 122 is greater than a first threshold or (2) downstream of the plurality of valve spools 122 is less than a second threshold.

In an embodiment, the method may further include activating, by the controller 140, a lock valve 164 fluidly connected to one of the hydraulic actuators 102 if no activation command is enabled for any of the plurality of valve spools 122, and the signal fluid pressure when detected (1) upstream of the plurality of valve spools 122 is greater than a first threshold or (2) downstream of the plurality of valve spools 122 is less than a second threshold.

In one embodiment, the method may include displaying on a display 150 a warning notice if no activation command is enabled for any of the plurality of valve spools 122, and the signal fluid pressure when detected (1) upstream of the plurality of valves spools 122 is greater than a first threshold or (2) downstream of the plurality of valve spools 122 is less than a second threshold.

In an embodiment, the method may include detecting the signal fluid pressure downstream of the plurality of valve spools 122.

The features disclosed herein may be particularly beneficial to machines 100 such as excavators that use hydraulic actuators 102 to control functions of the machine 100. The system 101 disclosed herein automatically detects a situation that may result in uncommanded operation of a machine function by the hydraulic actuators 102 and stops such uncommanded operation (or potential uncommanded operation) without the operator having to intervene or take action.

What is claimed is:

1. A method for detecting uncommanded positioning of at least one valve spool in a plurality of valve spools and for stopping a flow of fluid to a plurality of hydraulic actuators fluidly connected to the plurality of valve spools, the plurality of valve spools disposed downstream of a hydraulic pump and upstream of a reservoir, each valve spool of the plurality of valve spools having a neutral position and at least one active position, each valve spool of the plurality of valve spools configured to block the flow of the fluid to at least one of the plurality of hydraulic actuators when each valve spool of the plurality of valve spools is in the neutral position and further configured to provide the flow of the fluid to the at least one of the hydraulic actuators when each valve spool of the plurality of valve spools is not in the neutral position, the plurality of valve spools fluidly connected to a plurality of pilot pressure reducing valves, each valve spool of the plurality of valve spools configured to maintain the at least one active position when a pilot solenoid of one of the plurality of pilot pressure reducing valves is activated, the pilot solenoid activated when an activation command of a plurality of activation commands associated with a function of a machine controlled by each valve spool of the plurality of valve spools is enabled, the plurality of activation commands received by a controller from a user interface, the method comprising:
   receiving, by the controller, a signal fluid pressure detected in a signal passageway;
   identifying, by the controller, whether at least one activation command of the plurality of activation commands is currently enabled; and
   stopping, by the controller, the flow of the fluid to the plurality of hydraulic actuators if the at least one activation command is not enabled for any of the plurality of valve spools, and the signal fluid pressure when detected (1) upstream of the plurality of valve spools is greater than a first threshold or (2) downstream of the plurality of valve spools is less than a second threshold,
   wherein, when each valve spool of the plurality of valve spools is in the neutral position, the signal passage extends through each valve spool of the plurality of valve spools, wherein further, when any valve spool of the plurality of valve spools is not in the neutral position or is in the at least one active position, the signal passageway is blocked by each valve spool of the plurality of valve spools that is not in the neutral position or in the at least one active position.

2. The method of claim 1, further including detecting the signal fluid pressure upstream of a first valve spool in the plurality of valve spools, the first valve spool positioned along the signal passageway to receive signal fluid before any other valve spool of the plurality of valve spools.

3. The method of claim 2, further including:
supplying, by the hydraulic pump, a fluid to the signal passageway; and
detecting the signal fluid pressure downstream of an orifice in the signal passageway and upstream of the first valve spool.

4. The method of claim 2, wherein the flow of the fluid to the plurality of hydraulic actuators is stopped by deactivating the pilot solenoid of each pilot pressure reducing valve or by deactivating a pilot shutoff solenoid that is operatively connected to each of the plurality of pilot pressure reducing valves.

5. The method of claim 2, wherein the flow of the fluid to the plurality of hydraulic actuators is stopped by shutting-off the hydraulic pump.

6. The method of claim 2, further including activating, by the controller, a lock valve fluidly connected to one of the plurality of hydraulic actuators if the activation command is not enabled for any of the plurality of valve spools, and the signal fluid pressure when detected (1) upstream of the plurality of valves spools is greater than the first threshold or (2) downstream of the plurality of valve spools is less than the second threshold.

7. The method of claim 2, further including activating, by the controller, a swing brake operatively connected to one of the plurality of hydraulic actuators if the activation command is not enabled for any of the plurality of valve spools, and the signal fluid pressure when detected (1) upstream of the plurality of valves spools is greater than the first threshold or (2) downstream of the plurality of valve spools is less than the second threshold.

8. The method of claim 1, further including detecting the signal fluid pressure downstream of the plurality of valve spools.

9. A system for detecting uncommanded positioning of a first valve spool of a plurality of valve spools and for stopping a flow of a fluid to a plurality of hydraulic actuators fluidly connected to the plurality of valve spools, the system comprising:
the plurality of hydraulic actuators disposed on a machine;
the plurality of valve spools disposed downstream of a hydraulic pump and upstream of a reservoir, the first valve spool of the plurality of valve spools having a neutral position and at least one active position, the first valve spool configured to block the flow of the fluid to a first hydraulic actuator of the plurality of hydraulic actuators when in the neutral position and further configured to provide the flow of the fluid to the first hydraulic actuator when not in the neutral position or when in the at least one active position;
a plurality of pilot pressure reducing valves, each pilot pressure reducing valve of the plurality of pilot pressure reducing valves fluidly connected to one of the plurality of valve spools, each pilot pressure reducing valve of the plurality of pilot pressure reducing valves including a pilot solenoid configured to activate the pilot pressure reducing valve, each pilot pressure reducing valve of the plurality of pilot pressure reducing valves configured to place one of the valve spools in the neutral position or in the at least one active position;
a signal passageway that extends, when each valve spool of the plurality of valve spools is in the neutral position, through each valve spool of the plurality of valve spools to the reservoir, wherein when any valve spool of the plurality of valve spools is in the at least one active position, the signal passageway is blocked by any valve spool of the plurality of valve spools in the at least one active position;
the hydraulic pump configured to supply the fluid to the signal passageway and configured to supply the fluid to the plurality of hydraulic actuators via the plurality of valve spools;
a user interface configured to receive an activation command of a plurality of activation commands from a user, the plurality of activation commands associated with a machine function controlled by one or more of the plurality of valve spools; and
a controller configured to:
receive a signal fluid pressure detected in the signal passageway;
identify whether at least one activation command of the plurality of activation commands is currently enabled; and
stop the flow of the fluid to the plurality of hydraulic actuators if the at least one activation command is not enabled for any of the plurality of valve spools, and the signal fluid pressure when detected (1) upstream of the plurality of valves spools is greater than a first threshold or (2) downstream of the plurality of valve spools is less than a second threshold.

10. The system of claim 9, further including a display, and in which the controller is further configured to display a warning on the display when the at least one activation command is not enabled, and the signal fluid pressure when detected (1) upstream of the plurality of valves spools is greater than the first threshold or (2) downstream of the plurality of valve spools is less than the second threshold.

11. The system of claim 9, in which the signal passageway includes an orifice,
wherein the first hydraulic actuator of the plurality of hydraulic actuators is a hydraulic motor and a second hydraulic actuator of the plurality of hydraulic actuators is a hydraulic cylinder.

12. The system of claim 9, in which the controller is further configured to activate a brake if the at least one activation command is not enabled for the first valve spool and the signal fluid pressure (1) when detected upstream of the plurality of signal valves is greater than the first threshold or (2) when detected downstream of the plurality of signal valves is less than the second threshold, the brake operatively connected to the first hydraulic actuator of the plurality of hydraulic actuators, the first hydraulic actuator a motor.

13. The system of claim 9, in which the system further includes a pilot shutoff solenoid operatively connected to the plurality of pilot pressure reducing valves, wherein the flow of the fluid to the plurality of hydraulic actuators is stopped by deactivating the pilot solenoid of each pilot pressure reducing valve of the plurality of pilot pressure reducing valves or deactivating the pilot shutoff solenoid.

14. The system of claim 9, wherein the flow of the fluid to the plurality of hydraulic actuators is stopped by shutting-off the hydraulic pump.

15. The system of claim 14, wherein the signal fluid pressure was measured upstream of the plurality of valve spools.

16. A method for detecting uncommanded positioning of a first valve spool of a plurality of valve spools and for stopping a flow of a fluid to a first hydraulic actuator that is fluidly connected to the first valve spool, the plurality of valve spools disposed downstream of a hydraulic pump and upstream of a reservoir, the first valve spool having a first position and a second position, the first valve spool configured to block the flow of the fluid to the first hydraulic actuator when the first valve spool is in the first position and further configured to provide the flow of the fluid to the first hydraulic actuator when the first valve spool is not in the first position or is in the second position, the first valve spool configured to maintain the second position when a pilot supply is activated, the pilot supply activated when an activation command for a function of a machine controlled by the first valve spool is enabled, the activation command received by a controller from a user interface, the method comprising:

receiving, by the controller, a signal fluid pressure detected in a signal passageway;

identifying, by the controller, whether the activation command is currently enabled; and stopping, by the controller, the flow of the fluid to the first hydraulic actuator if the activation command is not enabled for the first valve spool and the signal fluid pressure (1) when detected upstream of the plurality of valve spools is greater than a first threshold or (2) when detected downstream of the plurality of signal valves is less than a second threshold, wherein, when the first valve spool is in the first position, the signal passage extends through the first valve spool, wherein further when the first valve spool is in the second position or is not in the first position, the signal passageway is blocked by the first valve spool.

17. The method of claim 16 further including detecting the signal fluid pressure upstream of the first valve spool, the first valve spool positioned along the signal passageway to receive signal fluid before any other valve spools of the plurality of valve spools.

18. The method of claim 16, wherein the pilot supply includes a first pilot pressure reducing valve operatively connected to a first pilot solenoid, the pilot supply operatively connected to a pilot shutoff solenoid, wherein the flow of the fluid to the first hydraulic actuator is stopped by deactivating the first pilot solenoid or deactivating the pilot shutoff solenoid or shutting off the hydraulic pump.

19. The method of claim 16, further including activating, by the controller, a brake if the activation command is not enabled for the first valve spool and the signal fluid pressure (1) when detected upstream of the plurality of signal valves is greater than the first threshold or (2) when detected downstream of the plurality of signal valves is less than the second threshold, the brake operatively connected to the first hydraulic actuator.

20. The method of claim 16, further including detecting the signal fluid pressure downstream of the plurality of valve spools.

* * * * *